US008361358B2

(12) United States Patent
Wolf

(10) Patent No.: US 8,361,358 B2
(45) Date of Patent: Jan. 29, 2013

(54) METHOD OF RECYCLING FIBERGLASS REINFORCED PLASTICS

(75) Inventor: Robert J. Wolf, Chariton, IA (US)

(73) Assignee: Astoria Industries of Iowa, Inc., Chariton, IA (US)

(*) Notice: Subject to any disclaimer, the term of this patent is extended or adjusted under 35 U.S.C. 154(b) by 891 days.

(21) Appl. No.: 11/682,752

(22) Filed: Mar. 6, 2007

(65) Prior Publication Data

US 2008/0217811 A1 Sep. 11, 2008

(51) Int. Cl.
*B29C 43/04* (2006.01)
*B29C 35/00* (2006.01)

(52) U.S. Cl. .................... 264/37.3; 264/140; 264/331.21

(58) Field of Classification Search ................. 264/36.1, 264/36.18, 36.22, 37.1, 37.28, 37.3, 911, 264/913, 915, 140, 331.21
See application file for complete search history.

(56) References Cited

U.S. PATENT DOCUMENTS

| 4,243,075 A * | 1/1981 | McPherson et al. .......... 138/174 |
| 4,245,059 A * | 1/1981 | Ichimura et al. ............. 525/170 |
| 4,283,446 A * | 8/1981 | McLain ....................... 428/36.3 |
| 4,692,291 A * | 9/1987 | Angell, Jr. ................... 264/109 |
| 4,834,933 A * | 5/1989 | Gardner et al. ............. 264/257 |
| 5,470,886 A * | 11/1995 | Makhlouf et al. ............ 521/59 |
| 5,660,770 A * | 8/1997 | Wernicke et al. ......... 264/37.28 |
| 5,681,194 A * | 10/1997 | Baker .......................... 442/394 |
| 5,830,305 A * | 11/1998 | Andersen et al. ............. 156/242 |
| 5,865,383 A * | 2/1999 | Ford et al. ....................... 241/36 |
| 5,879,601 A * | 3/1999 | Baker ............................ 264/112 |
| 5,884,962 A * | 3/1999 | Mattingly et al. ....... 296/187.05 |
| 6,248,271 B1 * | 6/2001 | Graham et al. ................. 264/39 |
| 6,264,454 B1 * | 7/2001 | Hale .............................. 425/89 |
| 6,663,737 B2 * | 12/2003 | Hsiao et al. .................. 156/160 |
| 2005/0266222 A1 * | 12/2005 | Clark et al. ................ 428/292.1 |
| 2006/0233907 A1 * | 10/2006 | Ruiz et al. ................. 425/387.1 |

FOREIGN PATENT DOCUMENTS

| JP | 05116228 A * | 5/1993 |
| JP | 09075250 A * | 3/1997 |
| JP | 2005081794 A * | 3/2005 |
| WO | WO 2005000566 A1 * | 1/2005 |

OTHER PUBLICATIONS

Sawada et al., Translation of JP 2005-081794 A, Mar. 2005.*
Seawolf Design, Inc. Grinder/Muncher and Spray-Up and Dry-additive Systems.
Kempler, 150 Ton Dake Hydraulic Molding Press, Aug. 30, 2006.
Briskheat, BriskHeat Vacuum Curing/Debulking Table (VT Series), Sep. 14, 2006.

* cited by examiner

*Primary Examiner* — Joseph Del Sole
*Assistant Examiner* — Ryan Ochylski
(74) *Attorney, Agent, or Firm* — Zarley Law Firm, P.L.C.

(57) ABSTRACT

A method of recycling fiberglass reinforced plastics. The steps include grinding used fiber reinforced plastic material such as scraps with a grinder into a predetermined length to form a grinded reinforced plastic material. The grinded reinforced material is then mixed with a mixing agent to form a composite material that is heated in order to cure the composite material to form a panel.

9 Claims, 4 Drawing Sheets

METHOD OF RECYCLING FIBERGLASS REINFORCED PLASTICS

BACKGROUND OF THE INVENTION

This invention relates to a method of recycling. More specifically, this invention relates to a method of recycling fiberglass reinforced plastics.

Fiberglass reinforced plastics (FRP) are a class of composite building material consisting of a fibrous reinforcement sheathed in a polymer matrix. The polymer matrix is applied as a liquid resin and chemically cures as a solid when an initiator is introduced. Reinforcing materials such as fiberglass, carbon, and Kevlar are often used as the reinforcing material in these types of composites. In this example, a polyester resin is used as the matrix and fiberglass is used as the reinforcing material.

Manufactures make FRP service truck bodies and truck caps for service and utility industries. When manufactured the fiberglass reinforced plastics process uses an open mold spray up process where glass and catalyzed resin are applied onto a mold surface. During this process a large quantity of solid waste is generated which currently must be disposed within a landfill. There are three primary types of waste generated which include overspray waste, trim waste, and grinding/cutout waste. Overspray waste is the glass and resin that misses the mold and hits the floor during operation. Trim waste is FRP trimmed off the edges of the product and the open mold. Grinding/cutout waste consists of solid FRP laminate cut out or ground away from a product to make openings for doors, wheel wells, and trim.

Thus, it is a principal object of the present to provide a method of recycling to make useful products out of fiberglass reinforced plastic waste material.

These and other objects, features, or advantages will become apparent from the specification and claims.

BRIEF SUMMARY OF THE INVENTION

A method for recycling fiberglass reinforced plastics for reusing in FRP truck bodies. The steps include grinding the fiber reinforced plastic materials with a grinder into a predetermined length to form a ground material. This ground material is then mixed with constituents to form a blend. This blend is then poured into a mold and compressed to form a panel. The panel is then used for a plurality of applications.

DETAILED DESCRIPTION OF THE PREFERRED EMBODIMENT

Figure 1:
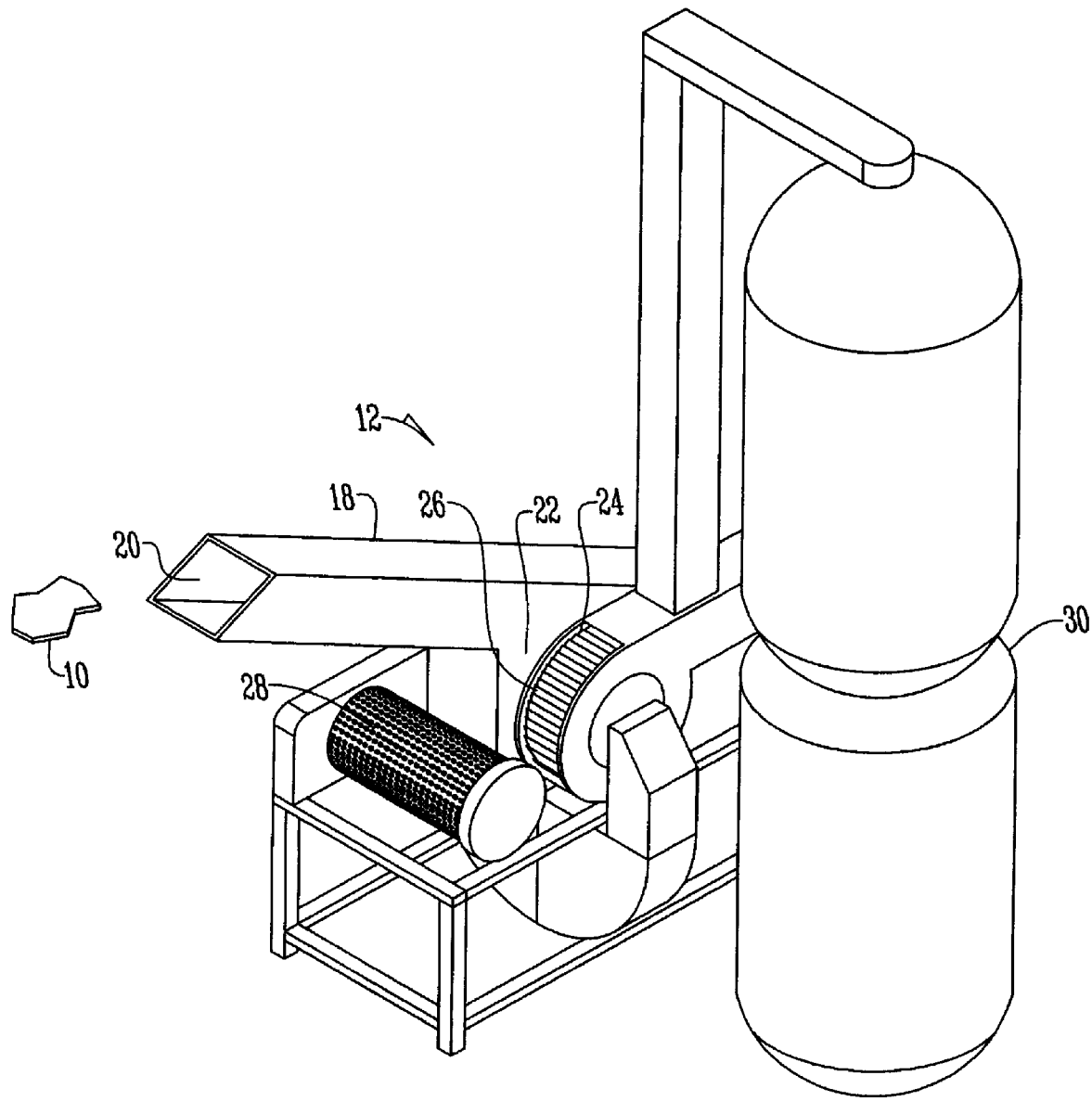
FIG. 1 is a side plan view with hidden lines of a grinder.
Figure 2:
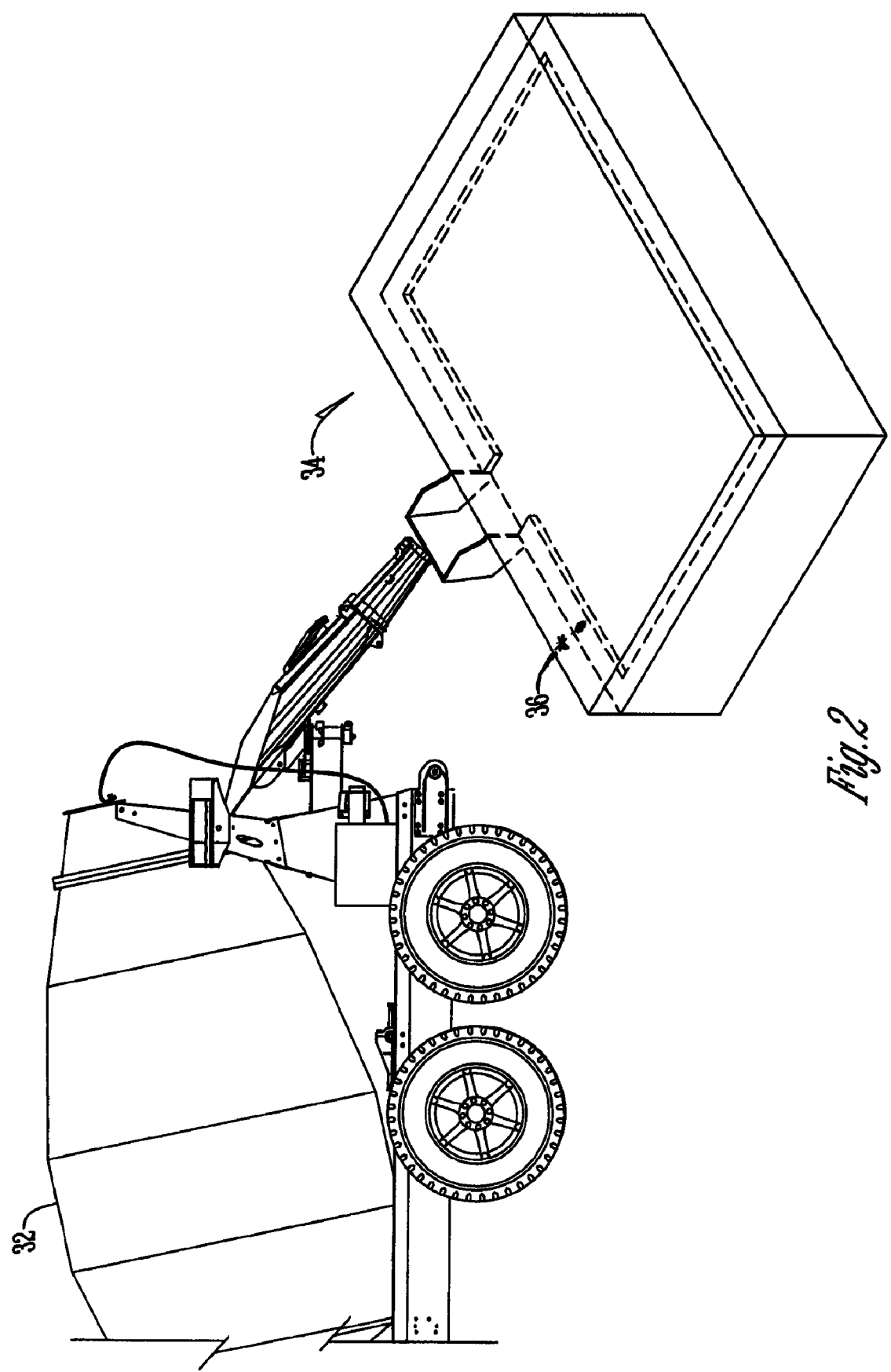
FIG. 2 is a side plan view of a mixing device and mold for recycling fiberglass material.

In order to perform the method of recycling fiberglass reinforced plastic scraps 10 a grinder 12 is used as shown in FIG. 1. The grinder 12 comprises a housing 18 with throat opening 20 that receives fiberglass reinforced plastics scraps 10 within a mulching compartment 22. Within the compartment 22 are a plurality of knives 24 with carbonite corners 26 to grind and mulch the fiberglass reinforced plastics. The plastic scraps 10 or materials are crushed and sliced by the knives 24 and a screen 28 is used to filter out the grounded scrap into a predetermined length. A built-in fan 30 within the grinder 12 helps control the temperature within the grinder 12 to virtually eliminate any risk of spontaneous combustion.

The ground scrap or material is then mixed with other constituents to achieve a proper blend. In a preferred embodiment the ground material is $\frac{3}{4}$. The constituents include but are not limited to a fixed amount of polyester resin, titanium dioxide that achieves a white pigment on the end product, thermoplastic micro spheres, and a catalyst that only initiates cure when heat activated such as Benzoyl Peroxide (BPO). When polyester resin and BPO are both used as constituents the polyester resin used is not promoted for BPO so the curing reaction only takes place when a predetermined elevated temperature is reached. Once this predetermined temperature is reached the reaction occurs rapidly.

In a preferred embodiment the blend is comprised of 35-40% ground FRP, 60-65% resin and 1% thermosplastic micro spheres. The pigment and catalyst are adjusted as required by the blend. The mixing is done with a mixing device 32. In one embodiment the mixing is done by hand using mixing devices in the form of drills with mixing blades or alternatively could be mixed in a batch process in a mixing device such as a cement or bakery mixer.

After the blend has been sufficiently mixed, the blend is poured into a mold 34 that comprises a predetermined shape depending upon the desired application. Design considerations such as beveled edges or surface graphics can be built right into the mold 34. In a preferred embodiment, panels are made which serve a number of purposes.

Figure 3:
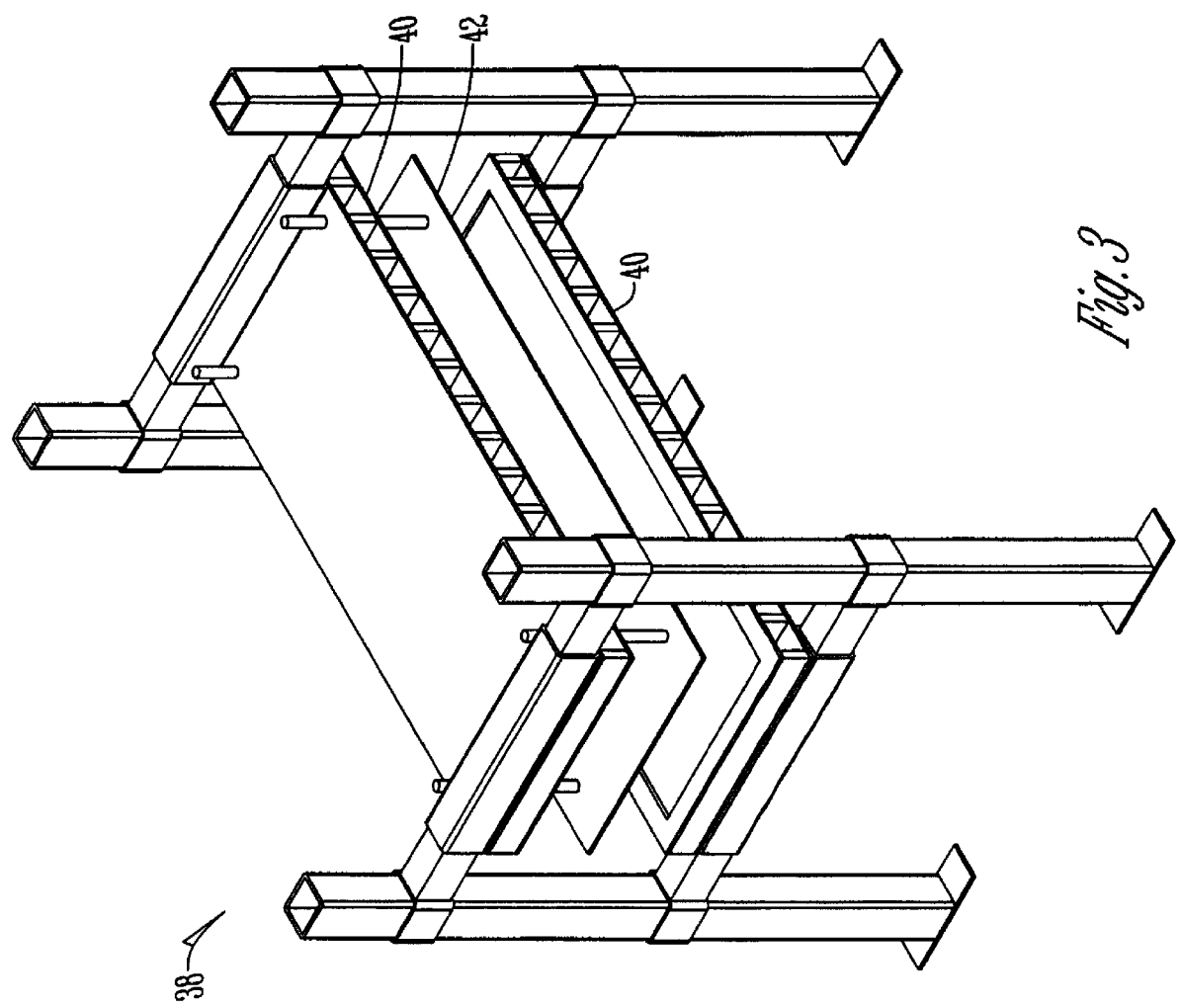
FIG. 3 is a side plan view of a pneumatic press.
Figure 4:
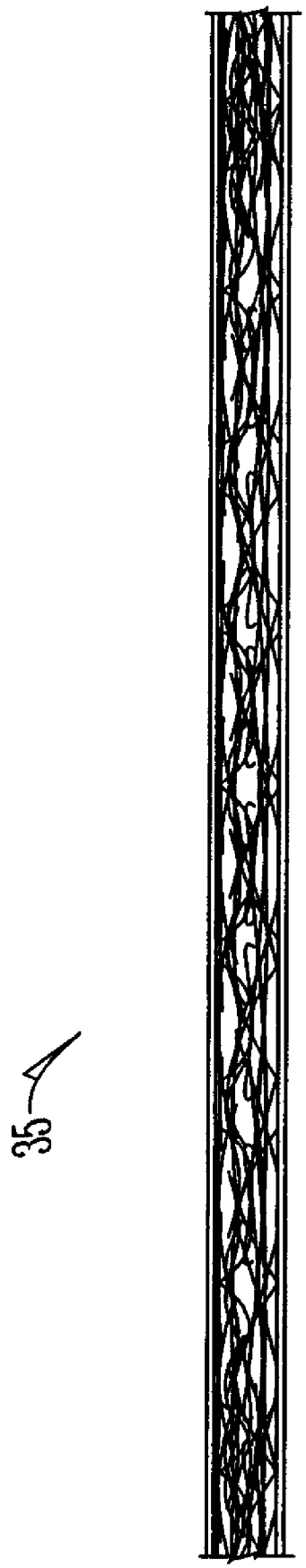
FIG. 4 is sectional view of a recycled panel.

When making panels 35 in a preferred embodiment, after the blend is poured into the mold 34, the blend is leveled out so that the top of the blend is parallel with the top of the mold 34. A smooth flat insert 36 is then placed over the poured blend in the mold 34 to get two flat sides. Preferably, an air operated press 38 (FIG. 3) provides the compression needed to make the resin flow throughout the mold 34 and achieve two flat sides without air voids. The platforms or platens 40 of the press 38 are electrically heated in order to cure the blend with the specific catalyst chosen. In a preferred embodiment, the thickest panel 35 made would be $\frac{3}{8}$ thick. Therefore the mold depth would be $\frac{3}{8}$ plus the volume displaced by the compression forces of the press 38. Mold stops 42 are used control the thicknesses of the panels.

After cure, the mold 34 is taken out of the press 38. The next mold 34 is placed in the press 38 to undergo the same process. During this time the part is pulled from the mold 34, the mold 34 is cleaned and the blend is poured into a second mold. At least three mold sets are needed to achieve the proper efficiency; one under compression, one being mixed and one being pulled and cleaned. The resulting panels have the appearance of white granite countertop.

The panels 35 are used in a variety of applications. Specifically the panels 35 can be used for reinforced coring of service and utility bodies, bulkheads in service and utility bodies, shelving sheets, shelving dividers, tailboards, and boxes. The benefits of these recycled panels include an aesthetically pleasing appearance, lighter weight, increased strength, and overall lower costs. The recycled panels were independently tested against $\frac{7}{16}$ OSB wood coring panels. The test results showed a 40% increase in tensile strength, a 27% increase in flexural strength, and a 90% increase in shear strength as compared to the OSB wood coring panels. Thus, disclosed is a recycling method that provides a method of reusing fiberglass reinforced plastics that provides paneling that is of improved strength and appearance over previous panels used in the industry. Thus, at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of recycling fiberglass reinforced plastics comprising the steps of:
grinding fiberglass reinforced plastic materials with a grinder to form a ground material;
mixing the ground material with constituents to create a blend;
pouring the blend into a mold;
providing a flat insert over the poured blend within the mold;
placing the mold with the blend therein into a pneumatic press;
compressing the blend-impregnated mold with the pneumatic press such that the a resin flows throughout the mold without air voids therein;
forming a panel;
wherein heated platens of the pneumatic press compress the blend in the mold and cause a heat activated catalyst to initiate a curing reaction when a predetermined elevated temperature is reached to cause the blend to cure in the mold; and
wherein the blend comprises a polyester resin that comprises 60-65% by weight of the blend and fiber reinforced plastic material that comprises 35-40% by weight of the blend.

2. The method of claim 1 wherein the grinder has a screen that filters the ground material into a predetermined length.

3. The method of claim 1 wherein the step of mixing the ground materials is provided using a batch process in a cement mixer.

4. The method of claim 1 wherein the grinder has a fan to control temperature in the grinder.

5. The method of claim 1 further comprising the step of heating the platens in order to initiate the curing reaction and cure the blend only at a predetermined elevated temperature based upon a specific catalyst.

6. The method of claim 5 wherein a resin constituent of the blend is not promoted for the catalyst such that the curing reaction only takes place when the predetermined elevated temperature is reached.

7. The method of claim 6 wherein the catalyst is benzoyl peroxide.

8. The method of claim 1 further comprising the step of providing the mold with a depth which includes the volume of the formed panel in addition to a volume of resin displaced by compression forces of the pneumatic press.

9. The method of claim 8 further comprising the step of providing the pneumatic press with mold stops to control a thickness of the panel.

* * * * *